United States Patent
Ho et al.

(10) Patent No.: US 11,252,221 B2
(45) Date of Patent: *Feb. 15, 2022

(54) ASSOCIATING AN ONLINE PUBLICATION WITH A PRINT PUBLICATION

(71) Applicant: eBay Inc., San Jose, CA (US)

(72) Inventors: Yuan Der Ho, San Mateo, CA (US); Choon Chong, Melaka (MY); Philip Law, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,820

(22) Filed: Feb. 12, 2020

(65) Prior Publication Data

US 2020/0228594 A1  Jul. 16, 2020

Related U.S. Application Data

(63) Continuation of application No. 14/081,555, filed on Nov. 15, 2013, now Pat. No. 10,601,899, which is a
(Continued)

(51) Int. Cl.
*G06F 15/16* (2006.01)
*H04L 29/08* (2006.01)
(Continued)

(52) U.S. Cl.
CPC ............ *H04L 67/10* (2013.01); *G06Q 30/02* (2013.01); *G06Q 30/08* (2013.01); *G06Q 90/00* (2013.01)

(58) Field of Classification Search
None
See application file for complete search history.

(56) References Cited

U.S. PATENT DOCUMENTS 6,446,045 B1 * 9/2002 Stone .................... G06Q 10/00
 705/26.1
7,210,103 B2 * 4/2007 Kasahara .............. G06F 16/958
 715/273

(Continued)

OTHER PUBLICATIONS

Final Office Action received for U.S. Appl. No. 11/964,922, dated Apr. 11, 2013, 15 pages.
(Continued)

*Primary Examiner* — Phuoc H Nguyen
(74) *Attorney, Agent, or Firm* — Holland & Hatt LLP

(57) ABSTRACT

This document discusses, among other things, a system and methods for associating an online publication with a print publication. Example embodiments may include receiving a request from a publisher that may identify first data that is to be published over a network, in an online publication. In response to the request, example embodiments may include fetching the first data and generating further data based on the first data. The further data may include an address to locate the online publication as published. The publisher may be allowed to publish the further data as a print publication. Subsequent to the print publication of the further data, example embodiments may include receiving the string of characters over the network from a user. Example embodiments may include presenting the online publication to the user based on the string of characters.

20 Claims, 14 Drawing Sheets

Related U.S. Application Data continuation of application No. 11/964,922, filed on Dec. 27, 2007, now Pat. No. 8,589,252.

(60) Provisional application No. 61/014,434, filed on Dec. 17, 2007.

(51) Int. Cl.
*G06Q 30/08* (2012.01)
*G06Q 30/02* (2012.01)
*G06Q 90/00* (2006.01)

(56) References Cited

U.S. PATENT DOCUMENTS

| | | | |
|---|---|---|---|
| 7,310,772 | B2 | 12/2007 | Whitfield |
| 7,343,324 | B2 | 3/2008 | Lao et al. |
| 7,921,097 | B1 | 4/2011 | Dandekar et al. |
| 8,589,252 | B2 | 11/2013 | Ho et al. |
| 10,601,899 | B2 | 3/2020 | Ho et al. |
| 2001/0032252 | A1* | 10/2001 | Durst, Jr. .......... G06F 16/9554 709/218 |
| 2001/0056463 | A1* | 12/2001 | Grady .................... G06Q 10/10 709/203 |
| 2002/0002490 | A1 | 1/2002 | Gerpheide |
| 2002/0178093 | A1* | 11/2002 | Dean ................. G06Q 30/0641 705/28 |
| 2003/0093563 | A1* | 5/2003 | Young ................. H04L 29/1233 709/245 |
| 2003/0121048 | A1 | 6/2003 | Hwang |
| 2003/0177111 | A1 | 9/2003 | Egendorf et al. |
| 2004/0054605 | A1 | 3/2004 | Whittet |
| 2004/0138951 | A1* | 7/2004 | Silverbrook ....... G06Q 30/0283 705/14.69 |
| 2004/0139049 | A1 | 7/2004 | Hancock et al. |
| 2005/0091282 | A1 | 4/2005 | Whitfield |
| 2005/0171838 | A1 | 8/2005 | Eglinton |
| 2006/0023945 | A1 | 2/2006 | King et al. |
| 2006/0036447 | A1 | 2/2006 | Roever et al. |
| 2006/0036585 | A1 | 2/2006 | King et al. |
| 2006/0104515 | A1 | 5/2006 | King et al. |
| 2006/0287936 | A1 | 12/2006 | Jacobson |
| 2007/0011155 | A1* | 1/2007 | Sarkar ..................... G06F 16/38 |
| 2008/0048044 | A1 | 2/2008 | Zhao et al. |
| 2008/0052349 | A1* | 2/2008 | Lin ...................... H04N 1/2187 709/203 |
| 2009/0125387 | A1* | 5/2009 | Mak ....................... G06Q 30/02 705/14.73 |
| 2009/0157415 | A1 | 6/2009 | Ho et al. |
| 2014/0074983 | A1 | 3/2014 | Ho et al. |

OTHER PUBLICATIONS

Final Office Action received for U.S. Appl. No. 11/964,922, dated Jan. 12, 2012, 15 pages.
Non-Final Office Action received for U.S. Appl. No. 11/964,922, dated Jan. 2, 2013, 14 pages.
Non-Final Office Action received for U.S. Appl. No. 11/964,922, dated Jun. 24, 2011, 16 pages.
Notice of Allowance received for U.S. Appl. No. 11/964,922, dated Jul. 19, 2013, 10 pages.
Response to Final Office Action filed on Jul. 12, 2012, for U.S. Appl. No. 11/964,922, dated Jan. 12, 2012, 11 pages.
Response to Non-Final Office Action filed on Apr. 2, 2013, for U.S. Appl. No. 11/964,922, dated Jan. 2, 2013, 12 pages.
Response to Non-Final Office Action filed on Oct. 24, 2011, for U.S. Appl. No. 11/964,922, dated Jun. 24, 2011, 13 pages.
McQuillen, "Getting Your Homepage Known", Incentive 169.12, Retrieved from the Internet URL: http://search.proquest.com/docview/213848041I13F3B03E02A51254CF5/189?accountid=14753, Dec. 1995, 3 pages.
Pardun, "Corporate Web Sites in Traditional Print Advertisements", Internet Research 9.2, 1999, 6 pages.
Sturdivant, "The Digital Edition: Heading Toward Its 'iPod Moment'?", Publishing Executive 22.7, Oct. 2007, pp. 48-50,53-57.
Response to Final Office Action filed on Jul. 11, 2013, for U.S. Appl. No. 11/964,922, dated Apr. 11, 2013, 12 pages.
Advisory Action received for U.S. Appl. No. 14/081,555, dated Mar. 19, 2019, 4 pages.
Advisory Action received for U.S. Appl. No. 14/081,555, dated Nov. 28, 2017, 5 pages.
Applicant-Initiated Interview Summary received for U.S. Appl. No. 14/081,555, dated Jan. 30, 2017, 3 pages.
Applicant-Initiated Interview Summary received for U.S. Appl. No. 14/081,555, dated Jul. 27, 2017, 3 pages.
Applicant-Initiated Interview Summary received for U.S. Appl. No. 14/081,555, dated Jul. 29, 2016, 3 pages.
Applicant-Initiated Interview Summary received for U.S. Appl. No. 14/081,555, dated Sep. 13, 2018, 3 pages.
Final Office Action received for U.S. Appl. No. 14/081,555, dated Aug. 30, 2017, 22 pages.
Final Office Action received for U.S. Appl. No. 14/081,555, dated Dec. 18, 2018, 22 pages.
Final Office Action received for U.S. Appl. No. 14/081,555, dated Oct. 26, 2016, 19 pages.
Non-Final Office Action received for U.S. Appl. No. 14/081,555, dated May 4, 2017, 21 pages.
Non-Final Office Action received for U.S. Appl. No. 14/081,555, dated May 16, 2016, 22 pages.
Non-Final Office Action received for U.S. Appl. No. 14/081,555, dated May 17, 2018, 28 pages.
Notice of Allowance received for U.S. Appl. No. 14/081,555, dated Nov. 18, 2019, 7 pages.
Preliminary Amendment filed on Mar. 7, 2014, for U.S. Appl. No. 14/081,555, 7 pages.
Response to Final Office Action and Advisory Action filed on Jan. 8, 2018, for U.S. Appl. No. 14/081,555 dated Aug. 30, 2017 and dated Nov. 28, 2017, 13 pages.
Response to Final Office Action filed on Jan. 27, 2017, for U.S. Appl. No. 14/081,555, dated Oct. 26, 2016, 13 pages.
Response to Final Office Action filed on Mar. 4, 2019 for U.S. Appl. No. 14/081,555 dated Dec. 18, 2018, 11 pages.
Response to Final Office Action filed on Oct. 30, 2017, for U.S. Appl. No. 14/081,555, dated Aug. 30, 2017, 11 pages.
Response to Non-Final Office Action filed on Aug. 17, 2018, for U.S. Appl. No. 14/081,555, dated May 17, 2018, 13 pages.
Response to Non-Final Office Action filed on Jul. 27, 2017, for U.S. Appl. No. 14/081,555, dated May 4, 2017, 9 pages.
Response to Non-Final Office Action filed on Sep. 16, 2016, for U.S. Appl. No. 14/081,555, dated May 16, 2016, 11 pages.

* cited by examiner

320 AND 322

APPLICATIONS

- 408 ONLINE PUBLICATION APPLICATION(S)
- 402 AUCTION APPLICATION(S)
- 414 NAVIGATION APPLICATION(S)
- 416 IMAGING APPLICATION(S)
- 418 LISTING CREATION (SELLER) APPLICATION(S)
- 428 MESSAGING APPLICATION(S)
- 430 MERCHANDIZING APPLICATION(S)
- 434 PRINT PUBLICATION APPLICATION
- 436 AFFILIATE APPLICATION

*FIG. 4*

ASSOCIATING AN ONLINE PUBLICATION WITH A PRINT PUBLICATION

RELATED APPLICATION

This application is a continuation of and claims the benefit of priority to U.S. patent application Ser. No. 14/081,555, filed Nov. 15, 2013, which is a continuation of and claims the benefit of priority under to U.S. patent application Ser. No. 11/964,922, filed on Dec. 27, 2007, which claims the benefit of priority under to U.S. Provisional Patent Application Ser. No. 61/014,434, filed Dec. 17, 2007, each of which is hereby incorporated by reference in its entirety.

TECHNICAL FIELD

This patent document pertains generally to online publications and more particularly, but not by way of limitation, to a system and methods for associating an online publication with a print publication.

BACKGROUND

Subject matter may be published online and made available to users of a computer network. The same or different subject matter may be published in print (e.g., printed on paper).

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4 is a block diagram illustrating multiple applications that, in an example embodiment, are provided as part of the networked system;

DETAILED DESCRIPTION

Overview

Example embodiments may allow a publisher to generate a print publication that is based on information suitable for an online publication. The print publication may be posted in a public place other than the Internet to be observed by members of the public. An example print publication includes a URL that may be used to access the online publication.

An online publication system may include an electronic online auction system. Example embodiments provide for encoding the identity of the publisher within a unique URL that maps to a further URL for the online publication. The online auction system may track transaction activity related to online publications arrived at via the unique URL. In various example embodiments, publishers of the printed publications (e.g., affiliates) are compensated for certain transactions associated with the printed publication generated by the publisher.

This overview is intended to provide an overview of the subject matter of the present patent application. It is not intended to provide an exclusive or exhaustive explanation of what is claimed. The example embodiments are included to provide further information about the subject matter of the present patent application.

EXAMPLE EMBODIMENTS

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. The embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1A:
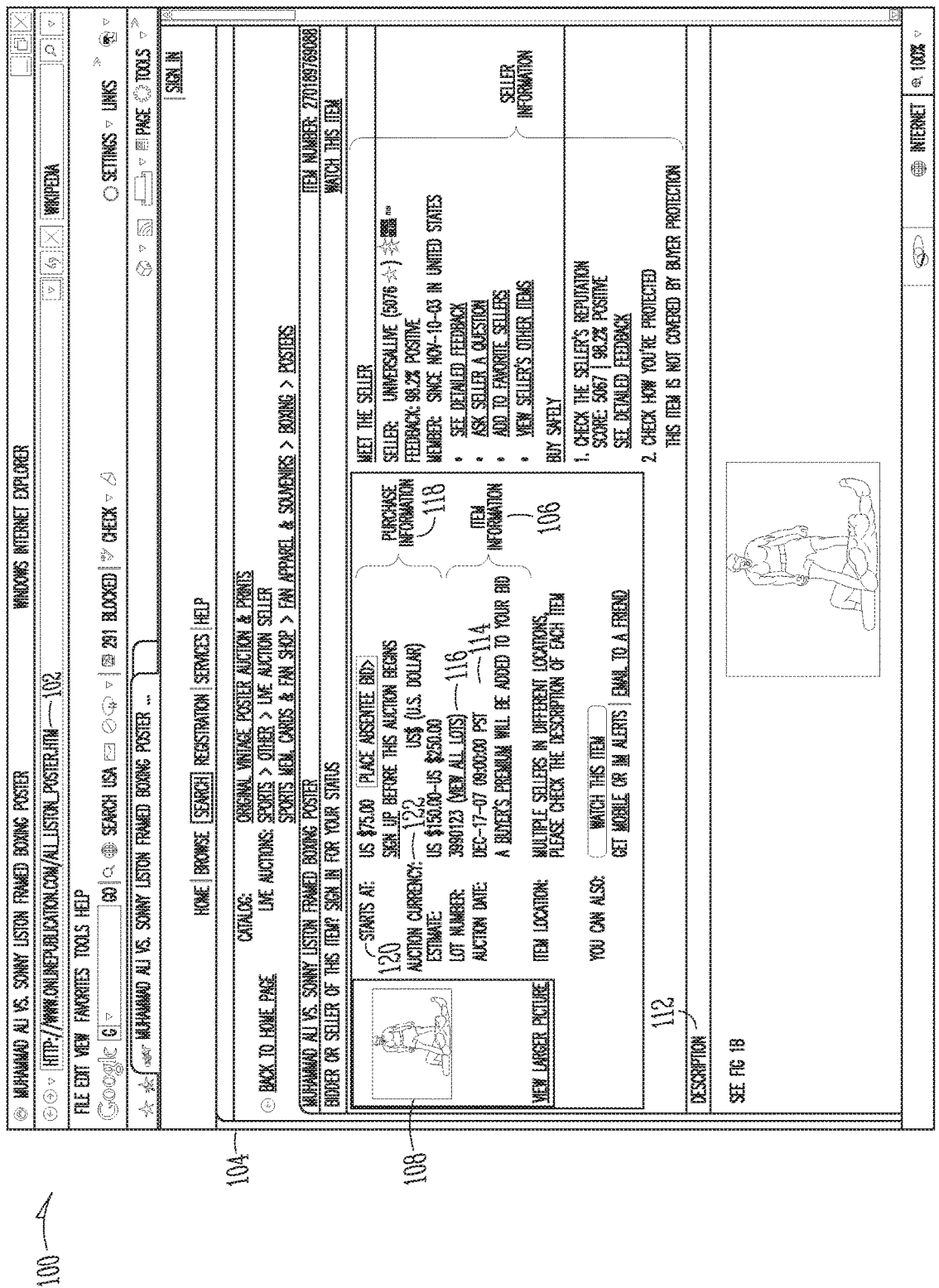
FIGS. 1A and 1B depict a mock interface for an example online publication, in accordance with an example embodiment.

FIG. 1 is a mock interface illustrating an example online publication 100, in accordance with an example embodiment. As will be described in more detail below, information in the example online publication 100 may be used to derive a print publication (see discussion of FIG. 2 below) that can be distributed or otherwise published, such as to the public; and which will include a string of characters that may be used to access the online publication.

The example online publication 100 may be presented via the Internet and is shown to be located at a web address 102 (e.g., the online publication may be found at http://www.onlinepublication.com/ali_liston_poster.htm). Of course, any Internet address may be used to address an example online publication but in an example embodiment, particular Internet addresses correspond to different online publications. As will be discussed below, the online publication may be displayed by web browser software running on the computer of a user.

In general, an online publication (e.g., the online publication 100) may include any subject matter and may be used to convey information about the subject matter for any reason. The online publications of the present application may be used in conjunction with different categories of publications. For example, online publications may facilitate electronic markets associated with the sale of goods, information (e.g., digital content, electronic documents) and/or services. Electronic commerce systems may use different price setting mechanisms. One example price setting mechanism is an auction; another is a fixed price market. Alternatively or additionally, the online publications may be associated with free goods, information and/or services. Subject matter may include an electronic document and related information may be published so that the electronic document may be found by a searcher on the Internet.

In an example embodiment, the subject matter of the online publication 100 is a poster (pictured at 108) and information about the poster is published as part of an online auction. The online publication 100 for the online auction will include several types of auction information about the subject matter of the auction. In many example embodiments, such as the auction listing of online publication 100, the auction information may include: item information 106 providing information about the subject matter of the auction; seller information 110 providing information regarding the auction seller; and purchase information 118 regarding the terms of auction, such as the pertinent currency, payment methods, etc.

Item information will typically include an auction date 114 for the auction and at least a title 104 providing a textual description of the subject matter (e.g., the goods, information and/or services) of the online publication 100. The example online publication is titled: "Muhammad Ali Vs. Sonny Liston Framed Boxing Poster" 104. The item information of the example online publication 100 is shown to include digital content 108 related to the poster being auctioned. The digital content may include a photo, image, video, or other rich media associated with the subject matter of the online publication.

Figure 1B:
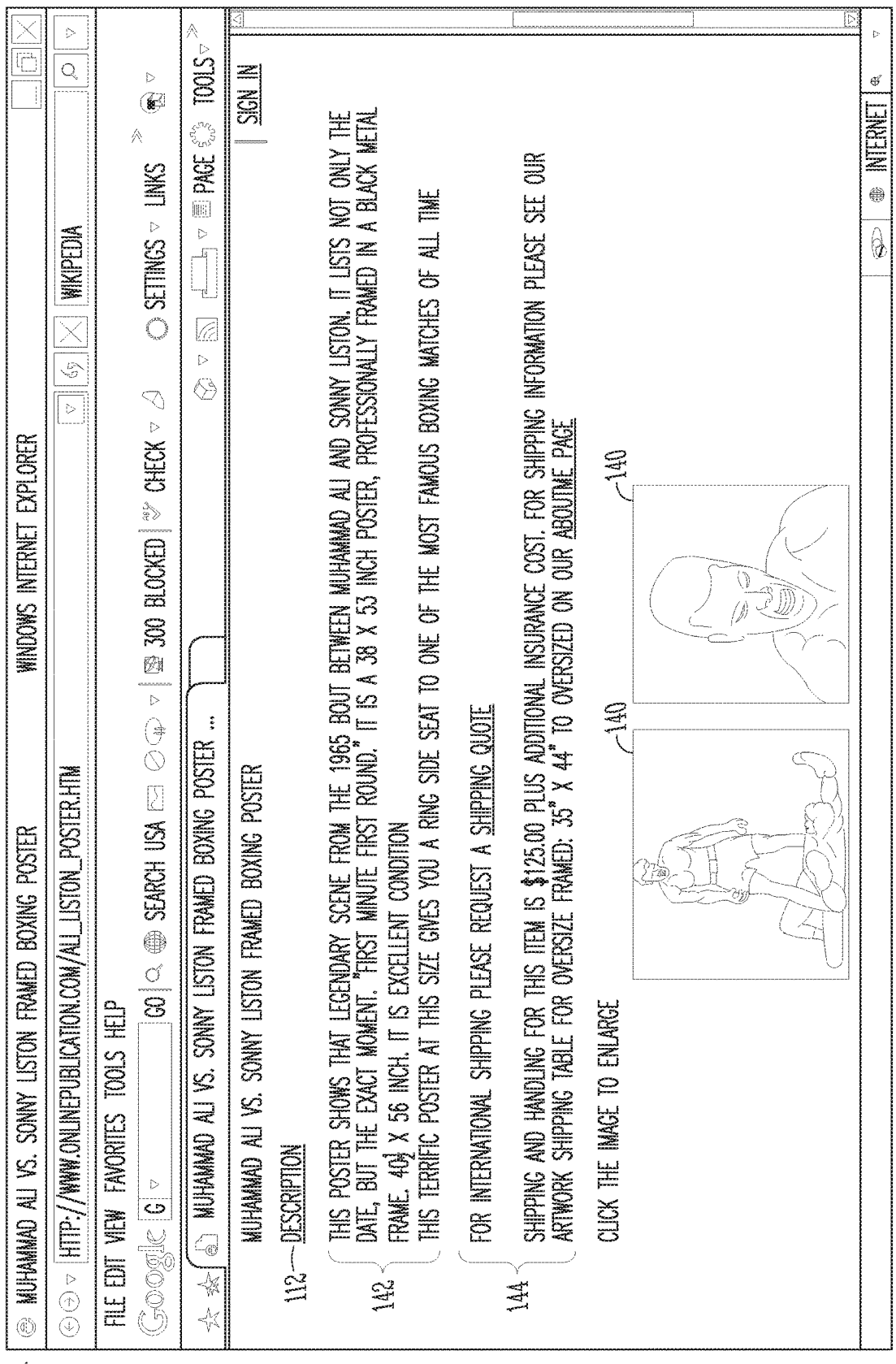

Such item information may also include a lot number 116 related to the item and an additional description 112 of FIG. 1B. FIG. 1B is a continuation of the mock-up interface in FIG. 1. In an example embodiment, the description section 112 includes one or more enlargeable images 140 of an item and a narrative description 142 of the item and may further include manufacturer specifications, shipping information, or any other descriptive information associated with the item 144.

The example online publication 100 purchase information is shown to include an auction starting price 120, and the currency used in the auction 122.

The example online publication 100 is further shown to include seller information 110. Seller information 110 may include hyperlinks to information that may be of interest to a potential buyer (e.g., information about the seller's reputation as a seller), a link to other items that seller is currently selling or other relevant information.

It is to be appreciated that a purpose of the online publication may determine the content of the online publication. For, example, online publications for electronic commerce (e.g., having price setting modes such as auction or fixed price) may include information about a seller. Online publications associated with free goods, information and/or services may not include information about a seller.

Figure 2:
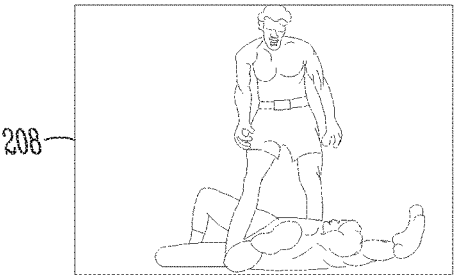
FIG. 2 is an example print publication based on an online publication, in accordance with an example embodiment.

FIG. 2 is an example print publication 200 based on information within the online publication 100, in accordance with an example embodiment. Much like the online publication, the print publication 200 may include any kind of subject matter and may be used to convey information about the subject matter to achieve any particular end. Various example print publications 200 are to be posted in a public place other than the Internet to advertise the subject matter of the print publication 200.

The print publication 200 is shown to include a title 204, item and purchase information 206 and the image 208 that may be substantially similar to those features described with respect to FIG. 1. The example print publication may further include a description 212 of the poster that is to be auctioned.

The example print publication 200 is shown to include multiple sub-divisions 220. Each sub-division 220 may be outlined with dotted lines to mark the borders 222 of each sub-division 220. In an example embodiment, each of the sub-divisions 220 is meant to be removable from the body of the print publication 200; and thus the sub-divisions may be perforated or at least partially separated to facilitate the ready removal of each sub-division from the others and from the remainder of the print publication. The body of the print publication may include all of the print publication 200 other than the sub-divisions 220.

Each sub-division 220 of the print publication 200 is shown to include a title 224 and an address 226 as shown in each of the example sub-divisions. Each address 226 may be associated with the online publication 100 and/or a publisher of the printed publication 200.

Figure 3:
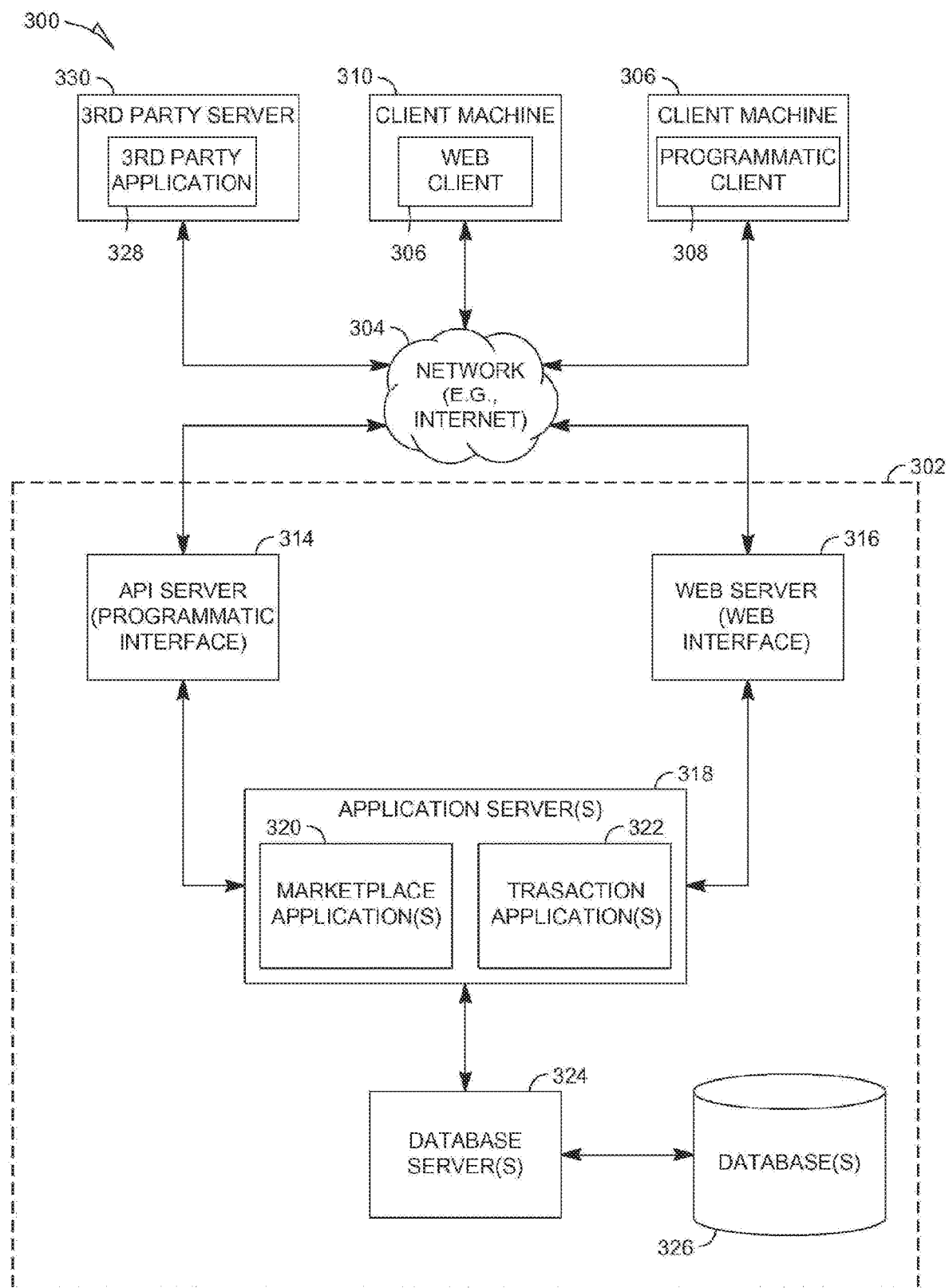
FIG. 3 is a network diagram depicting a client-server system, within which one example embodiment may be deployed.

FIG. 3 is a network diagram depicting a client-server system 300, within which one example embodiment may be deployed. A networked system 302, in the example forms of a network-based marketplace or publication system, provides server-side functionality, via a network 304 (e.g., the Internet or Wide Area Network (WAN)) to one or more clients. FIG. 3 illustrates, for example, a web client 306 (e.g., a browser, such as the Internet Explorer browser developed by Microsoft Corporation of Redmond, Wash. State), and a programmatic client 308 executing on respective client machines 310 and 312.

An Application Program Interface (API) server 314 and a web server 316 are coupled to, and provide programmatic and web interfaces respectively to, one or more application servers 318. The application servers 318 host one or more marketplace applications 320 and payment applications 322.

The application servers 318 are, in turn, shown to be coupled to one or more databases servers 324 that facilitate access to one or more databases 326.

The marketplace applications 320 may provide a number of marketplace functions and services to users that access the networked system 302. The marketplace applications 320 may for example include one or more applications to generate online applications and print publications associated with certain subject matter. The transaction applications 322 may likewise provide a number of payment services and functions to users. The transaction applications 322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 320. While the marketplace and transaction applications 320 and 322 are shown in FIG. 3 to both form part of the networked system 302, it will be appreciated that, in alternative embodiments, the transaction applications 322 may form part of a transaction service that is separate and distinct from the networked system 302.

Further, while the system 300 shown in FIG. 3 employs client-server architecture, the present invention is of course not limited to such architecture, and could equally well find application in a distributed, or peer-to-peer, architecture system, for example. The various marketplace and payment applications 320 and 322 could also be implemented as standalone software programs, which do not necessarily have networking capabilities.

The web client 306 accesses the various marketplace and transaction applications 320 and 322 via the web interface supported by the web server 316. In some example embodiments, a publisher may use the web client 306 of the client machine 310 to initiate the generation of information to be published in a print publication pertaining to a particular subject matter. Users may also use a web client such as the web client 306 to interact with online publications made available by the networked system 302.

Similarly, the programmatic client 308 accesses the various services and functions provided by the marketplace and payment applications 320 and 322 via the programmatic interface provided by the API server 314. The programmatic client 308 may, for example, be a seller application (e.g., the TurboLister application developed by eBay Inc., of San Jose, Calif.) to enable sellers to author and manage listings on the networked system 302 in an off-line manner, and to perform batch-mode communications between the programmatic client 308 and the networked system 302.

FIG. 3 also illustrates a third party application 328, executing on a third party server machine 330, as having programmatic access to the networked system 302 via the programmatic interface provided by the API server 314. For example, the third party application 328 may, utilizing information retrieved from the networked system 302, support one or more features or functions on a website hosted by the third party. The third party website may, for example, provide one or more promotional, marketplace or payment functions that are supported by the relevant applications of the networked system 302.

Marketplace Applications

FIG. 4 is a block diagram illustrating multiple applications 320 and 322 that, in an example embodiment, are provided as part of the networked system 302. The applications 320 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 326 via the database servers 328.

The networked system 302 may provide a number of publishing, listing and price-setting mechanisms whereby a seller may list (or e.g., publish information concerning) goods or services for sale, a buyer can express interest in or indicate a desire to purchase such goods or services, and a price can be set for a transaction pertaining to the goods or services. To this end, the marketplace applications 320 are shown to include at least one online publication application 400 and one or more auction applications 402 which support auction-format listing and price setting mechanisms (e.g., English, Dutch, Vickrey, Chinese, Double, Reverse auctions etc.).

The online publication application(s) 408 may locate and arrange information (e.g., listing information) to present online publications to web clients (e.g., the web client 306). The various auction applications 402 may also provide a number of features in support of such auction-format listings, such as a reserve price feature whereby a seller may specify a reserve price in connection with a listing and a proxy-bidding feature whereby a bidder may invoke automated proxy bidding. It is to be appreciated that other price setting mechanisms (e.g., a fixed price mechanism) may be used in example embodiments.

Navigation of the networked system 302 may be facilitated by one or more navigation applications 414. For example, a search application (as an example of a navigation application) may enable key word searches of listings published via the networked system 302. A browse application may allow users to browse various category, catalogue, or inventory data structures according to which listings may be classified within the networked system 302. Various other navigation applications may be provided to supplement the search and browsing applications.

In order to make listings, available via the networked system 302, as visually informing and as attractive as possible, the marketplace applications 320 may include one or more imaging applications 416 utilizing which users may upload images for inclusion within listings. An imaging application 416 also operates to incorporate images within viewed listings. The imaging applications 416 may also support one or more promotional features, such as image galleries that are presented to potential buyers. For example, sellers may pay an additional fee to have an image included within a gallery of images for promoted items.

Listing creation applications 418 allow sellers conveniently to author listings pertaining to goods or services that they wish to transact via the networked system 302.

Messaging applications 428 are responsible for the generation and delivery of messages to users of the networked system 302, such messages for example advising users regarding the status of listings at the networked system 302 (e.g., providing "outbid" notices to bidders during an auction process or to provide promotional and merchandising information to users). Respective messaging applications 428 may utilize any one of a number of message delivery networks and platforms to deliver messages to users. For example, messaging applications 428 may deliver electronic mail (e-mail), instant message (IM), Short Message Service (SMS), text, facsimile, or voice (e.g., Voice over IP (VoIP))

messages via the wired (e.g., the Internet), Plain Old Telephone Service (POTS), or wireless (e.g., mobile, cellular, WiFi, WiMAX) networks.

Merchandising applications 430 support various merchandising functions that are made available to sellers to enable sellers to increase sales via the networked system 302. The merchandising applications 430 also operate the various merchandising features that may be invoked by sellers, and may monitor and track the success of merchandising strategies employed by sellers.

Print publication applications 434 may support the generation of information to be published in print in a location other than an address on the Internet. The information may be based on subject matter of an online publication hosted by the networked system 302. A third party (e.g., an affiliate, generating sales on behalf of the seller for a commission) may interact with the print publication application 434 (via the networked system 302) to generate a print publication that can be used to direct a potential buyer to the online publication. In an example embodiment, the print publication applications 434 cooperates with the online publication applications 408, affiliate application 436 and other applications in a fashion described in more detail below.

The affiliate applications 436 may quantify transactions and commissions associated with affiliates of the seller. In example embodiments, the affiliate applications 436 calculates compensation to be paid to an affiliate in exchange for the affiliate initiating a sale of an item featured in an online publication. Some example affiliate applications 436 credit an affiliate for an item sale resulting from the posting of a print publication (e.g., the print publication 200).

Figure 5:
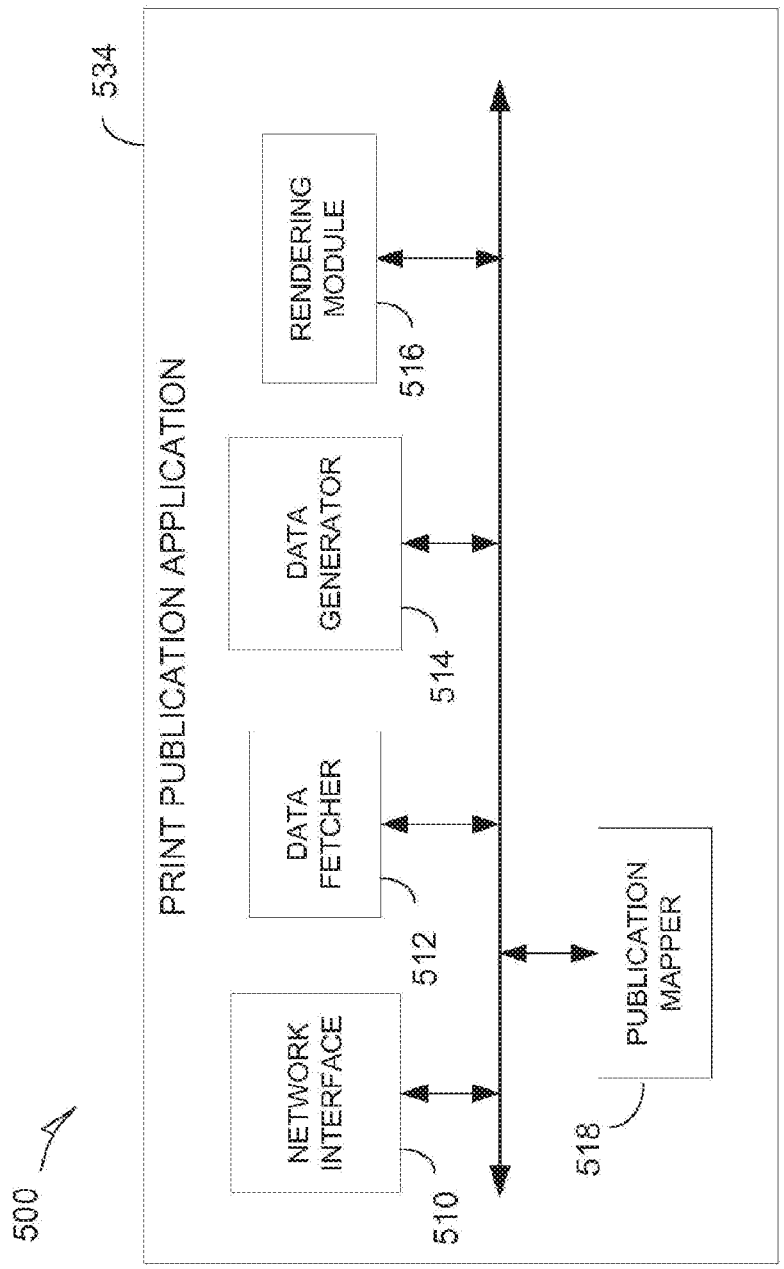
FIG. 5 is a block diagram illustrating an example print publication application, in accordance with an example embodiment.

FIG. 5 is a block diagram 500 illustrating an example print publication application 534, in accordance with an example embodiment. The print publication application 534 is shown to include the modules 510, 512, 514, 516 and 518, each to be described in operation below. In general, the modules may be operative to implement various algorithms and/or logical configurations in furtherance of the print publication application's 534 functionality. It is to be noted that each "module" may be implemented with hardware, software or a combination of hardware and software.

In various example embodiments one or more of the modules 510, 512, 514, 516 and 518 are implemented by electronic circuitry in a computer system such as the computer system 1500 of FIG. 15 that is discussed in more detail below. The electronic circuitry may be a hardwired implementation of instructions that correspond to one or more algorithms to provide the functionality of the modules described herein. One form of electronic circuitry includes a configurable integrated circuit. One type of integrated circuit includes an application specific integrated circuit (ASIC) that is typically designed to perform a limited set of particular functions.

In some example embodiments, one or more of the modules 510, 512, 514, 516 and 518 are implemented by instructions (e.g., the instructions 1524) that are executed by a computer processor (e.g., the computer processor 1502). The instructions (e.g., the instructions 1524) may be stored in a computer readable medium (e.g., the computer readable medium 1522).

In example embodiments, one or more of the modules 510, 512, 514, 516 and 518 are implemented by a both software instructions executed by a processor and by electronic circuitry implementing a logical configuration to provide the module's or modules' functionality.

Data Structures

Figures 6, 7:
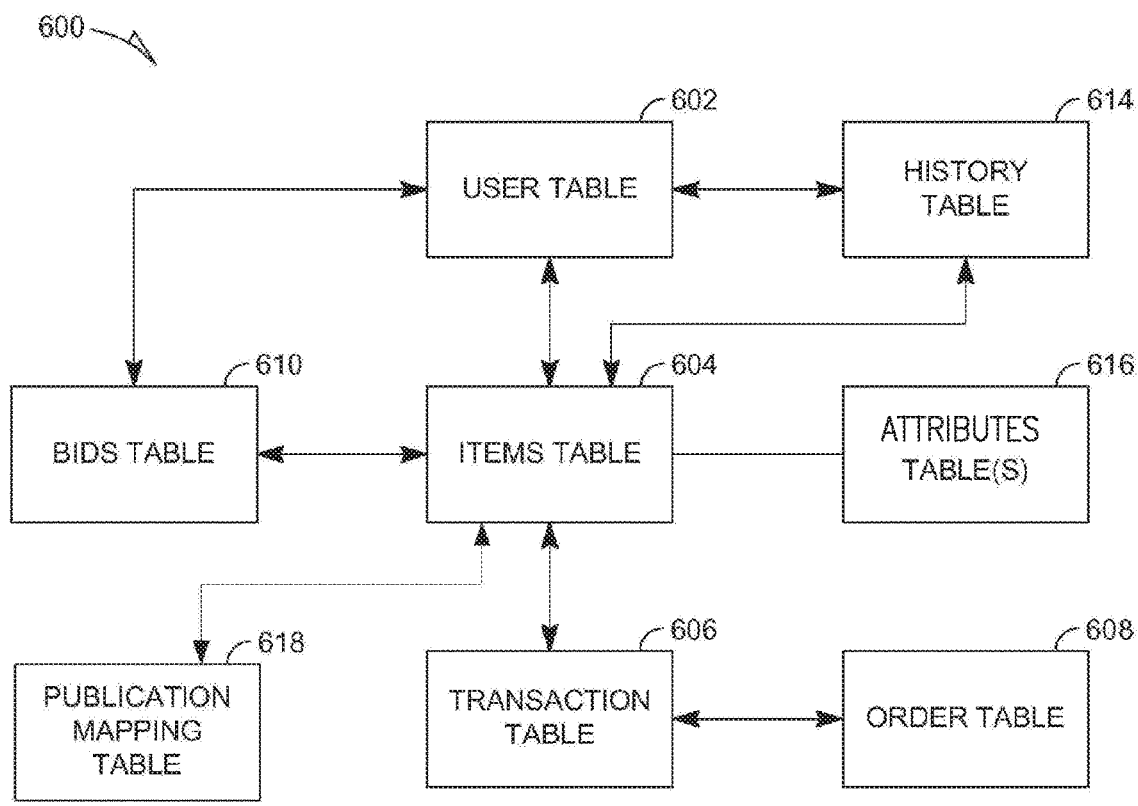
FIG. 6 is a high-level entity-relationship diagram, illustrating various tables, in accordance with an example embodiment.
FIG. 7 shows a table providing further details regarding a publication mapping table, in accordance with an example embodiment.

FIG. 6 is a high-level entity-relationship diagram, illustrating various tables 600 that may be maintained within the databases 326, and that are utilized by and support the applications 320 and 322. A user table 602 contains a record for each registered user of the networked system 302, and may include identifier, address and financial instrument information pertaining to each such registered user. A user may operate as a seller, a buyer, or both, within the networked system 302. In one example embodiment, a buyer may be a user that has accumulated value (e.g., commercial or proprietary currency), and is accordingly able to exchange the accumulated value for items that are offered for sale by the networked system 302.

The tables 600 also include an items table 604 in which are maintained item records for goods and services that are available to be, or have been, transacted via the networked system 302. Each item record within the items table 604 may furthermore be linked to one or more user records within the user table 602, so as to associate a seller and one or more actual or potential buyers with each item record.

A transaction table 606 contains a record for each transaction (e.g., a purchase or sale transaction) pertaining to items for which records exist within the items table 604.

An order table 608 is populated with order records, each order record being associated with an order. Each order, in turn, may be with respect to one or more transactions for which records exist within the transaction table 606.

Bid records within a bids table 610 each relate to a bid received at the networked system 302 in connection with an auction-format listing supported by an auction application 402. A history table 614 maintains a history of transactions to which a user has been a party. One or more attributes tables 616 record attribute information pertaining to items for which records exist within the items table 604. Considering only a single example of such an attribute, the attributes tables 616 may indicate a currency attribute associated with a particular item, the currency attribute identifying the currency of a price for the relevant item as specified in by a seller.

Publication mapping table 618 may include an association between a string of characters provided with a print publication (e.g., FIG. 2), a web address of an online publication (e.g., the online publication 100 of FIG. 1) and a publisher identifier that identifies the publisher of the print publication. In an example embodiment, the data generator 514 of FIG. 5 populates the publication mapping table 618 and the publication mapper 518 may access the publication mapping table 618.

FIG. 7 shows a table 700 providing further details regarding the publication mapping table 618 that is to be maintained within the databases 326. The example table 618 is shown to include a string column 702 for the string of characters provided within a print publication. The online publication address column 706 may be for indicating an online publication address associated with the string of characters in column 702. The publisher identifier column 708 is accordingly for a publisher identifier, if any, associated with the string and the online publication.

Figure 8:
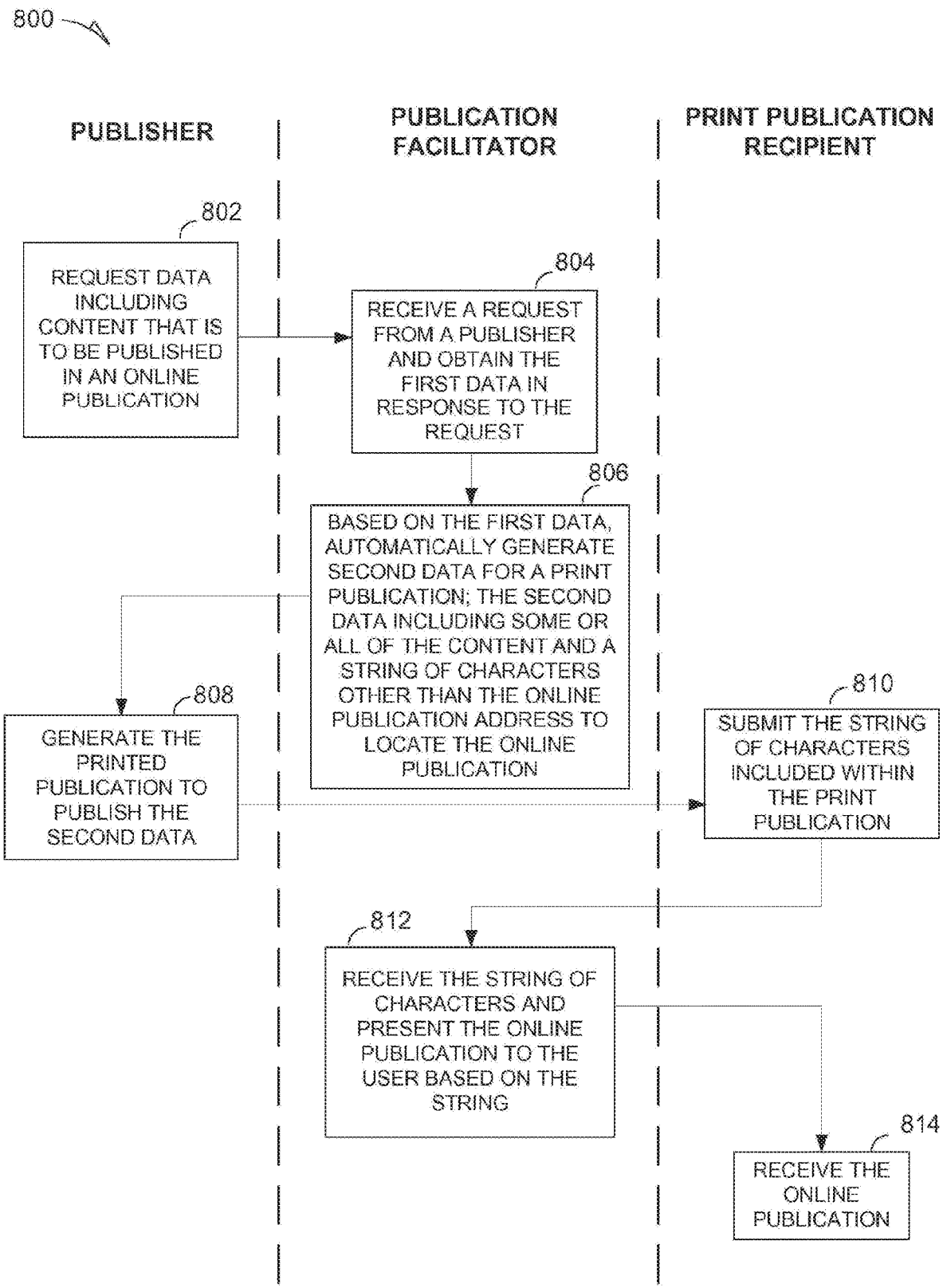
FIG. 8 is a flow diagram illustrating a method for associating an online publication with a print publication, in accordance with an example embodiment.

FIG. 8 is a flow diagram illustrating a method 800 for associating an online publication with a print publication, in accordance with an example embodiment. At block 802, the method may include a publisher requesting data (e.g., first data) including content that is to be published in an online publication at an online publication address.

Figure 9:
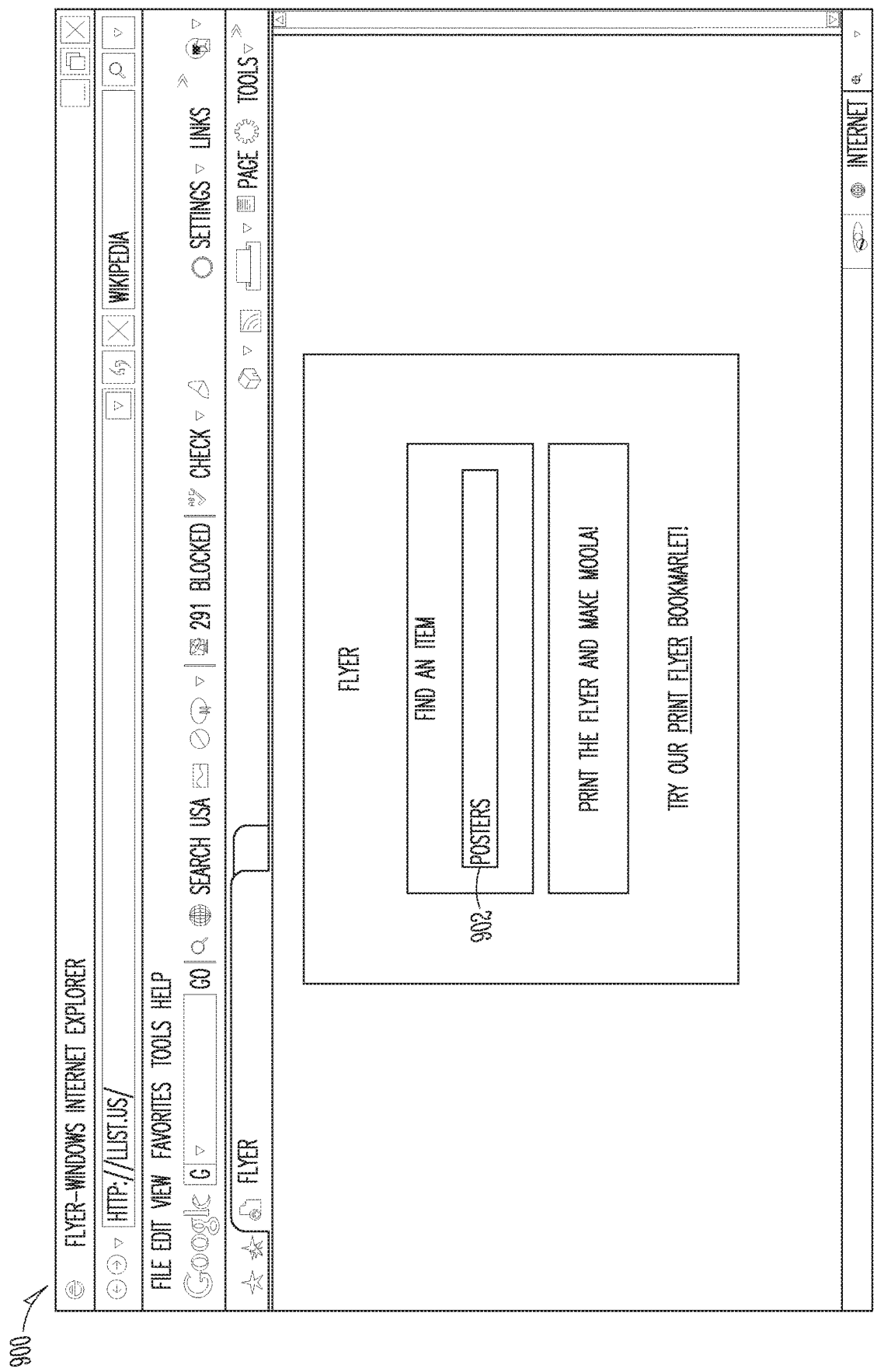
FIG. 9 is a mock interface showing an example browser interface with a text box, in accordance with an example embodiment.

FIG. 9 is a mock interface showing an example browser interface 900 including a text box, in accordance with an example embodiment. The publisher referenced in block 802 may enter a search term (e.g., "posters") into the text box 902 and hit return to receive the results of the search. The navigation application(s) 414 may receive the search term and access the items table 604 to find items in the databases 326 associated with the search term. In some example embodiments, the navigation applications may query the online publication application(s) 408 for listings associated with the search term.

Figure 10:
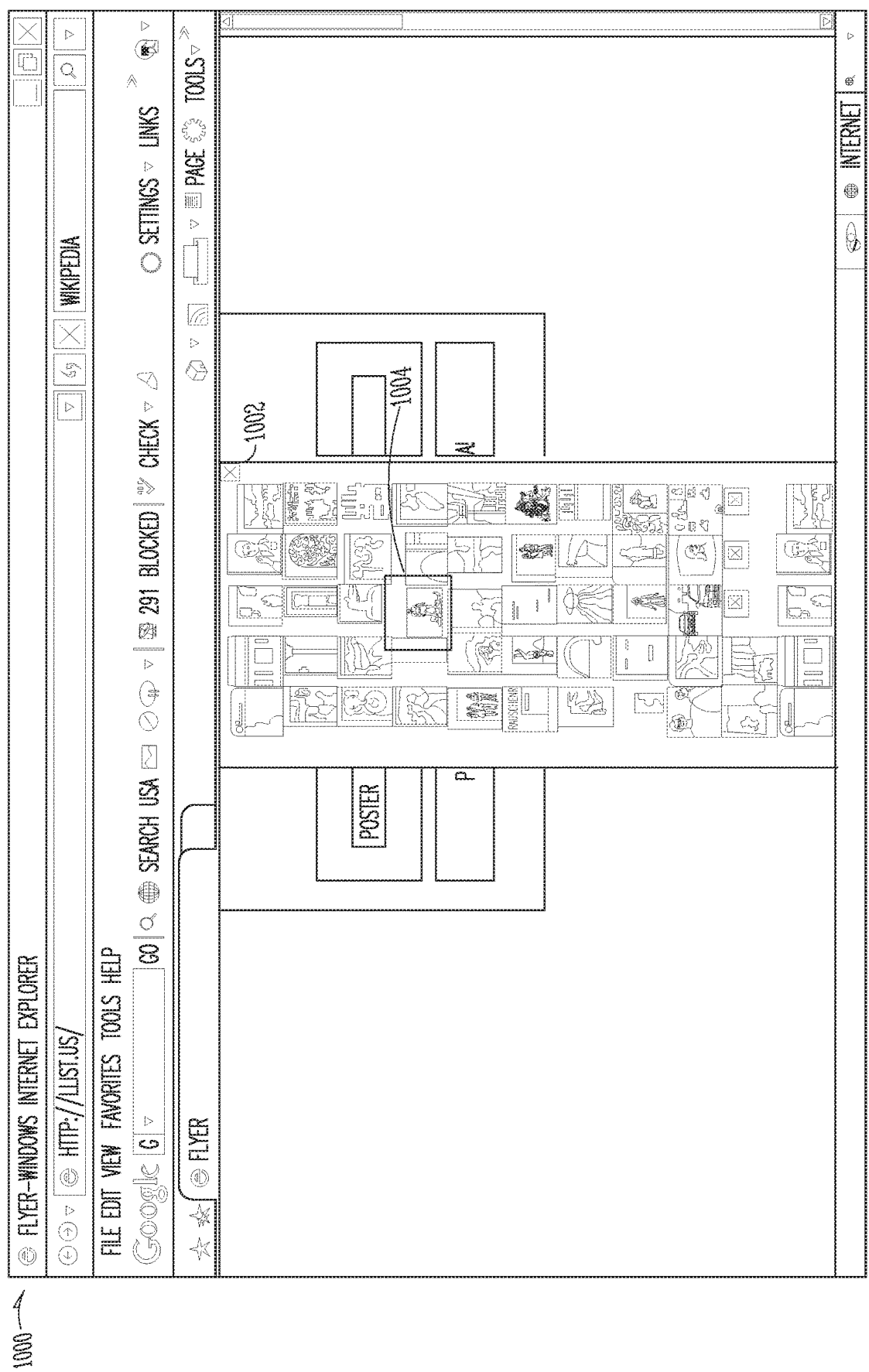
FIG. 10 is a mock interface showing a further example browser interface with a results window, in accordance with an example embodiment.

FIG. 10 is a mock interface showing a further browser interface 1000 with a results window, in accordance with an example embodiment. The browser interface 1000 may include a set of search results for the search described above. The imaging application(s) 416 and/or the navigation applications 414 may retrieve images from the databases 326 to include with the search results. In an example embodiment, the search results may include an image of the poster 1004. The publisher may interact with the image of the poster 1004 (e.g., by clicking on the image) to submit the request for data (e.g., first data) that is to be published via the network 304 as an online publication 100.

The network interface 510 of FIG. 5 may be coupled to a web server (e.g., the web server 316) hosting the web pages described with respect to FIGS. 9 and 10. Thus, the network interface 510 may receive from a publisher, via a browser interface 1000, the request that identifies the data to be included in the online publication.

At block 804, the method 800 may include obtaining the data (e.g., the first data) in response to the request from the publisher. In FIG. 500, the data fetcher 512 may receive the request from the network interface 510 and fetch the data (e.g., the first data) in response to the request. In some embodiments, the data fetcher 512 fetches the data via the online publication application(s) 408 and/or the items table 604.

At block 806, the method 800 may include automatically generating further data (e.g., second data) based on the data (e.g., the first data). The further data may include some or all of the content that is to be published in the online publication. The further data may also include a string of characters that does not include the online publication address but may be used to locate the online publication on the network. In various example embodiments, the data generator 514 may receive the data (e.g., the first data) from the data fetcher 512 and automatically generate the further data (e.g., second data) based on the data (e.g., first data).

The example rendering module 516 may receive the further data from the data generator 514 and render the further data to provide to the publisher and allow the publisher to publish the further data as a print publication. The string of characters within the further data is to be available to the user and may facilitate access to the online publication. The rendering module 516 may provide the further data to the publisher via the web server 316. In an example embodiment, the further data is rendered as portable document file (PDF).

At block 808, the method 800 may include the publisher generating a print publication to publish the further (e.g., the second) data.

In some example embodiments, the rendering module 516 may render the further data to provide to the publisher, a printable electronic document such as the printable document 200 with multiple removable sub-divisions 220 each including the aforementioned string of characters. Each of the sub-divisions 220 may be detachable from the document once printed (e.g., on paper). The further data included within the print publication may include a title, a keyword, a price or an item description, or any other publication data, etc. In various example embodiments, the publisher may post the printed publication 200 in a location where people can see it and remove a sub-division to take away. If one were to find the subject matter of the printed publication interesting, he or she may remove one of the removable sub-divisions 220 that may include a URL (e.g., the address 226) leading to an online publication (e.g., the online publication 100) featuring the subject matter.

At block 810, the recipient of the print publication (e.g., a user or potential buyer, etc.) may submit the string of characters included within the print publication. An example form of submitting the address may be to enter a URL (e.g., the address 226) including the string of characters and printed on the sub-division into an address bar of a browser interface (e.g., the address bar 102). The address may correspond to a web page provided by the web server 316.

At block 814, the method 800 may include receiving the string of characters from a user, via the network and based on the string of characters, presenting the online publication to the user. In FIG. 500, the publication identifier 520 may receive the string of characters from the user via the network 304 and cause online publication application (e.g., the online publication application(s) 408) to automatically provide, via the web server (e.g., the web server 3016) the online publication to the user based on the string of characters.

At block 814, the user may receive the online publication from the web server 316 for viewing on a web browser (e.g., the web client 306). In an example embodiment, the online publication may include data (e.g., first data) that includes a content or a listing for an item for sale or any other publication data.

Subsequent to viewing the online publication, the user or some other user may interact with the online publication to initiate a transaction associated with the subject matter of the online publication. In an example embodiment, a transaction application (e.g., the transaction application 322) may be coupled to the web server 408 and may facilitate such a transaction.

Figure 11:
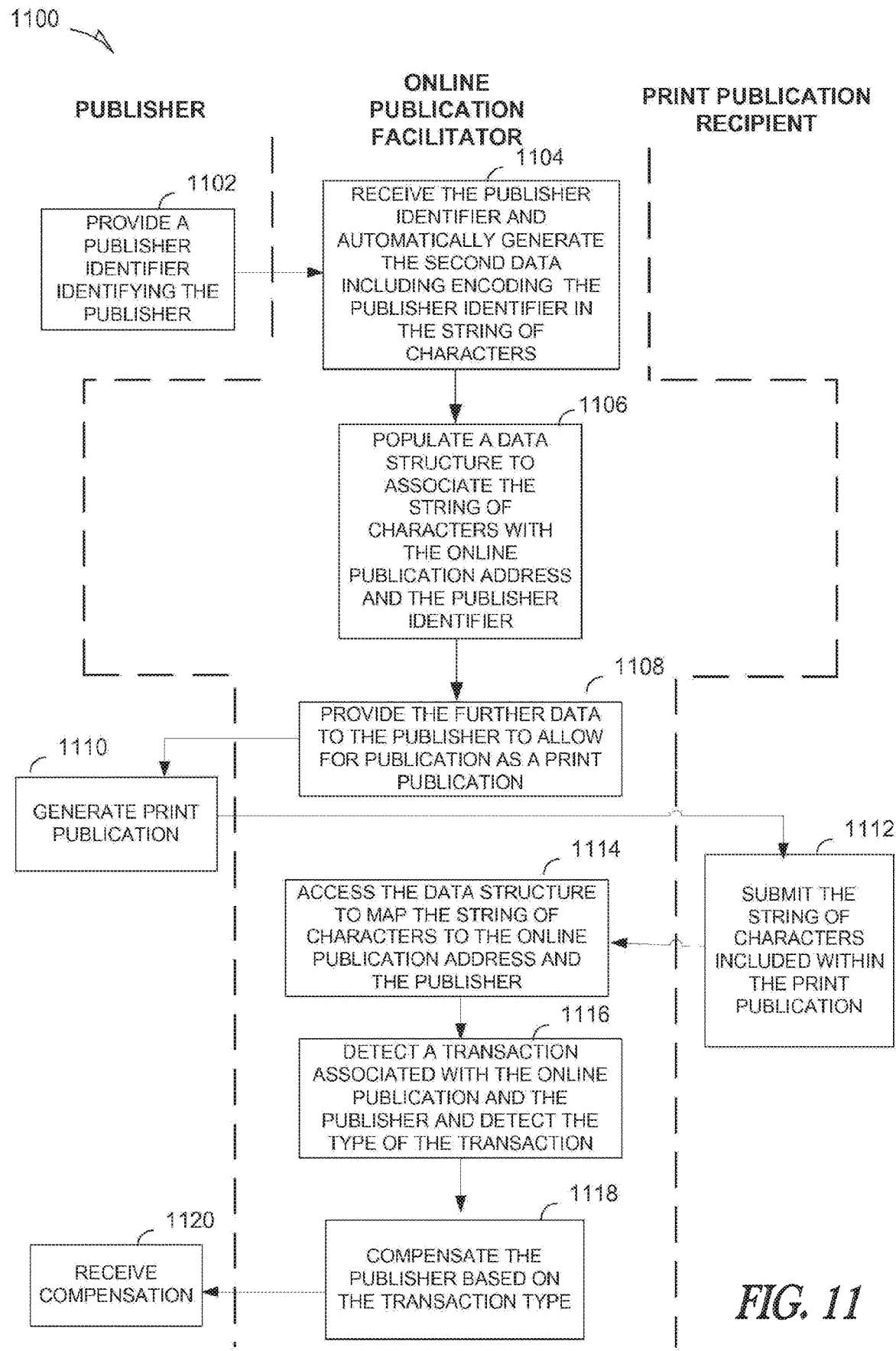
FIG. 11 is a flow diagram illustrating a method for associating an online publication with a publisher of a print publication, in accordance with an example embodiment.

FIG. 11 is a flow diagram illustrating a method for associating a string of characters with an online publication address and a publisher of a print publication. Aside from receiving information linking a print publication 200 with an online publication 100, the networked system 304 may receive information linking a publisher to the print publication 200.

Figure 12:
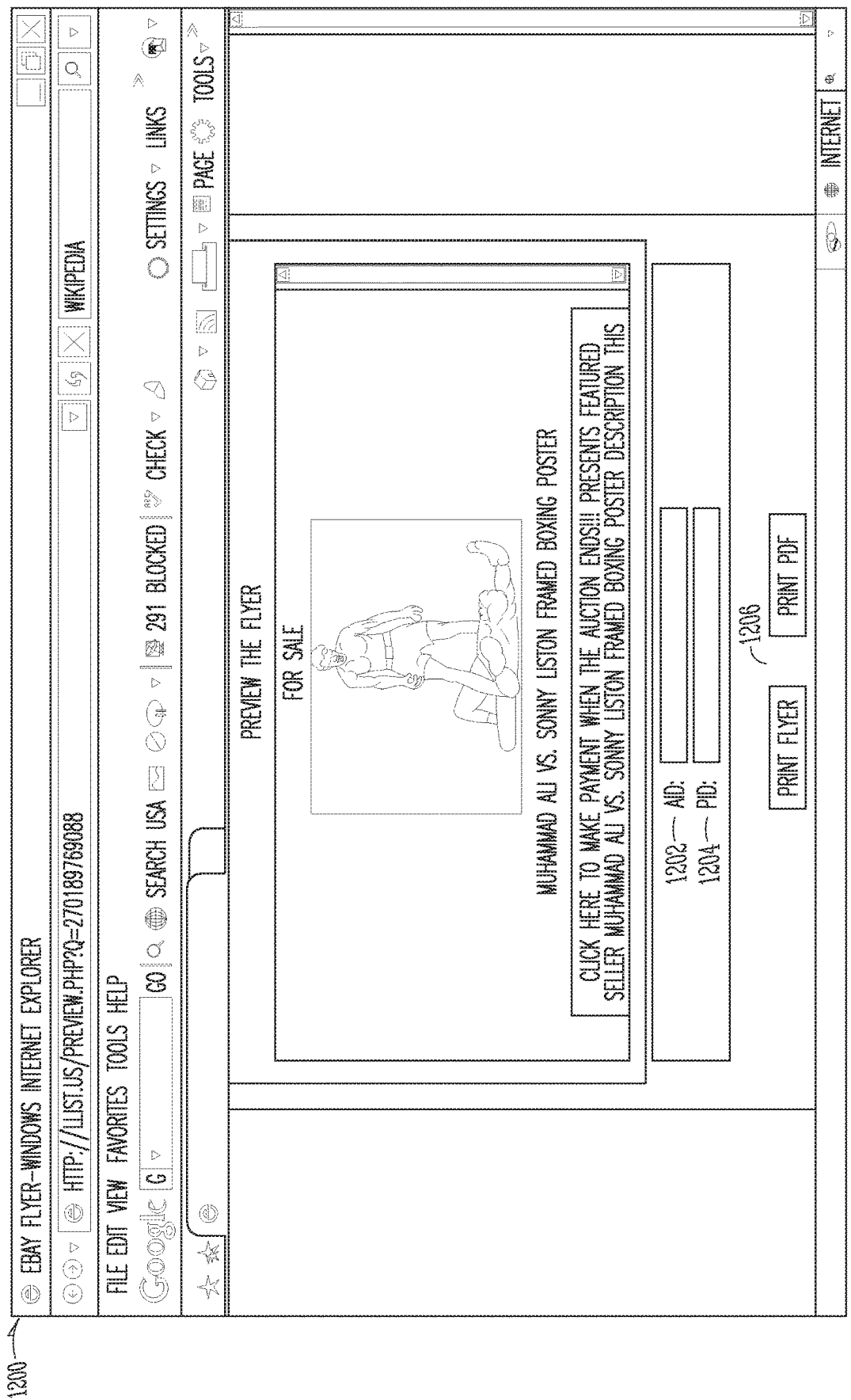
FIG. 12 is a mock interface showing an example browser interface including an identity entry form, in accordance with an example embodiment.

In Block 1102, the method 1100 may include the publisher providing to the networked system 304, a publisher identifier identifying the publisher of the print publication. FIG. 12 is a mock interface showing an example browser interface 1200 with publisher identifier entry form, in accordance with an example embodiment. A publisher may navigate to this web page from a print publication preview page (not shown). In an example embodiment, the publisher may provide the publisher identifier by entering an affiliate identification (AID) 1202 and/or a publication identification (PID) 1204 and then clicking one of the print buttons 1206. An AID may identify the publisher of a print publication while the publication identification may identify that the publication is to be a print publication.

At block 1104, the networked system 304 may receive the publisher identifier (e.g., at the network interface 510) and automatically generate (e.g. the data generator 514 may generate) the further data (e.g., second data generated based on first data) including encoding the the publisher identifier in the string of characters.

At block 1106, the method 1100 may include populating a data structure (e.g., the publication mapping table 618 within the database 326) based on the further data to associate the string of characters with an online publication (e.g., including the first data) and the publisher identifier.

Figure 13:
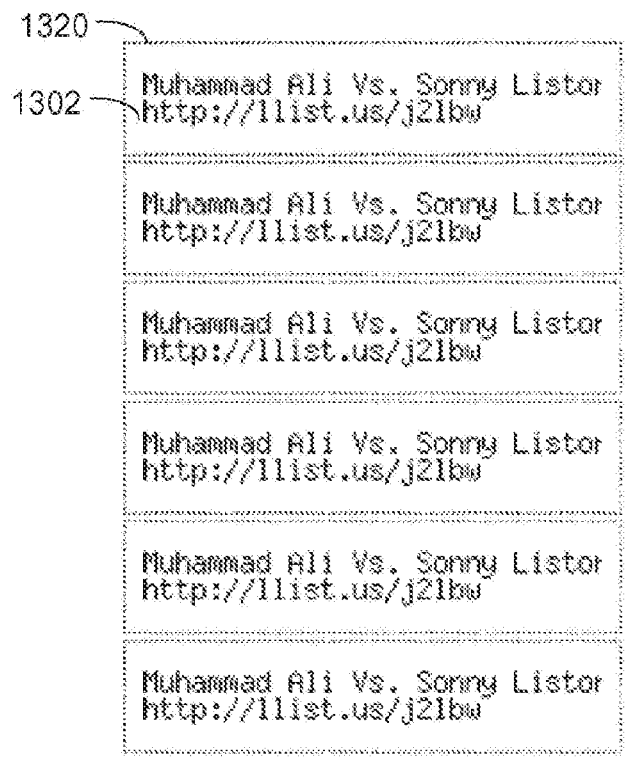
FIG. 13 is a block diagram that shows example subdivisions including a uniform resource locator (URL), in accordance with an example embodiment.

In various example embodiments, the data generator 514 generates a URL including the string of characters that encodes the online publication address and the publisher identifier (e.g., the AID and/or the PID). FIG. 13 is a block diagram that shows example sub-divisions (e.g., selected from the sub-divisions 220) including the URL 1302 that includes the string of characters "j2lbw". In an example embodiment "j2lbw" may map to the address of the online publication and identify the publisher of the print publication.

Figure 14:
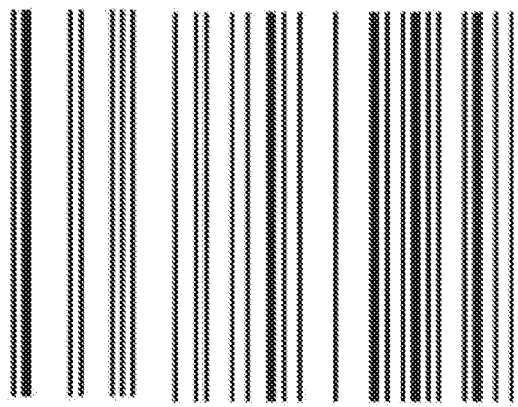
FIG. 14 is an image that shows an example bar code, in accordance with an example embodiment.

In some example embodiments, the data generator 514 may generate the further data as a bar code that encodes the URL. FIG. 14 is an image that shows an example bar code 1400, in accordance with an example embodiment. The example bar code 1400 may encode the information encoded within each URL 1302. A mobile phone (not shown) for example, may have an ability to capture an image of the example bar code and extract information encoded within the bar code 1400. Some mobile phones may use the information to interact with the online publication from the mobile phone.

At blocks 1108 the method 1100 may include providing the further data to the publisher to allow for publication as a print publication. At block 1110 the publisher may generate the print publication.

At block 1112, a user or potential customer having knowledge of the string of characters 1302 (e.g., the string of characters and the publisher identifier included within the print publication) may submit them to the networked system 302.

Block 1114 of the method 1100 may include accessing one or more data structures to determine the online publication address and the publisher. In an example embodiment, the publication mapper 518 accesses the data structure (e.g., the publication mapping table) 618 to map the string of characters to the online publication address and the publisher identifier. In an example embodiment, the string of characters corresponds i to a further URL including a web address of the online publication. Likewise, the publisher identifier (e.g., the AID and PID) may correspond to a particular publisher and the type of publication.

For example, the string of characters and the publisher identifier may be encoded within the URL:
http://flyer.com/ABCD,
that may be mapped via data structure to the URL:
http://onlineauction.com/ws/
102345&PID=123&PID=456

In the above mapping of URLs, the "ABCD" represents the string of characters. The "http://onlineauction.com/ws/102345" portion represents the address of the online publication and the "&PID=123&AID=456" portion represents a publication type and publisher identifier information. In an example embodiment, corresponding values are found in the same row of the publication mapping table 618.

At block 1116, the method 1100 may include detecting a transaction associated with the online publication and detecting a transaction type of the transaction. After detecting a transaction and transaction type associated with a particular online publication, the affiliate application 436 may associate the online publication with the printed publication and the publisher of the printed publication.

In an example embodiment, once it has been determined that an AID has been entered by a publisher (see block 1114), the affiliate application 436 may be notified by one or more of the identifier modules 518, 520. In some embodiments, the affiliate application may insert a cookie into the user's or customer's browser application to track the user's interactions with the online publication.

In various example embodiments, the affiliate application 436 may detect transactions processed by the transaction applications 322 and may query the publication mapper 518 to determine whether any publishers of printed publications are associate with a detected transaction associated with online publication. In some example embodiments, the affiliate application 436 may directly access one or more of the first and second data structures 618, 620 to determine whether any publishers or printed publications are associated with a particular online publication.

At block 1118, the method 1100 may include (e.g., the affiliate applications 436) compensating the publisher based on the detected transaction type. The affiliate application 436 may detect that the transaction type is a sale, an account registration or any other transaction that warrants providing compensation. In some example embodiments, the affiliate application 436 may trigger the transaction application 322 to pay a higher compensation for the sale transaction than for the account registration transaction.

Figure 15:
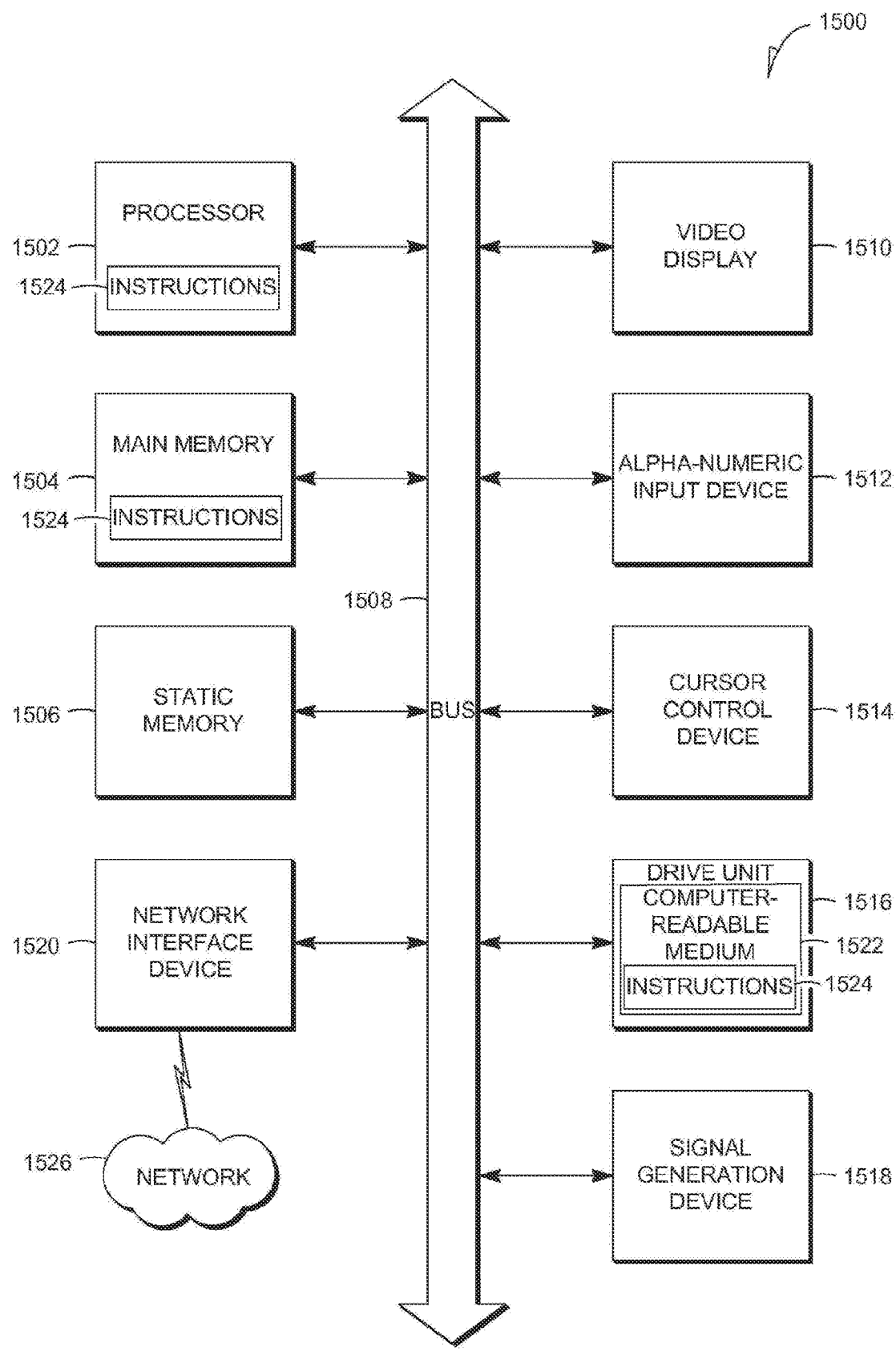
FIG. 15 shows a diagrammatic representation of machine in the example form of a computer system, in accordance with an example embodiment.

FIG. 15 shows a diagrammatic representation of machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A computer implemented method comprising:
   receiving, by a computer processor, a publication request that identifies content to be published in an online publication at a second network address;
   generating, by the computer processor, a scannable code that encodes a first network address different from the second network address, the first network address comprising a string of characters for the online publication;
   transmitting the scannable code to a publisher;
   receiving, from a user device, a retrieval request associated with the online publication and comprising the first network address corresponding to the scannable code;
   mapping the string of characters to the second network address of the online publication based at least in part on the retrieval request associated with the online publication; and
   causing, by the computer processor, presentation of the online publication by the user device based at least in part on the retrieval request and the second network address.

2. The method of claim 1, further comprising:
   receiving, via the publication request, publisher identifier information associated with the publisher, wherein generating the scannable code that encodes the first network address comprises encoding the publisher identifier information within the string of characters.

3. The method of claim 1, wherein transmitting the scannable code to the publisher comprises:
   transmitting the scannable code to the publisher along with an instruction to generate a print publication that comprises at least a portion of the content and the scannable code.

4. The method of claim 1, further comprising:
   detecting a transaction associated with the online publication; and
   compensating the publisher based at least in part on the transaction.

5. The method of claim 4, wherein compensating the publisher comprises:
   compensating the publisher based at least in part on the transaction being a sale transaction or an account registration transaction.

6. The method of claim 5, further comprising:
   compensating the publisher a higher compensation for the sale transaction than for the account registration transaction.

7. The method of claim 1, wherein the content comprises an item listing that includes at least one of a title, a keyword, a sales price, and an item description.

8. The method of claim 1, wherein the scannable code comprises a barcode.

9. A system, comprising:
   a processor; and
   a non-transitory machine-readable storage medium coupled to the processor, the non-transitory machine-readable storage medium including instructions that, when executed by the processor, cause the system to perform operations comprising:
      receiving a publication request that identifies content to be published in an online publication at a second network address;
      generating a scannable code that encodes a first network address different from the second network address, the first network address comprising a string of characters for the online publication;
      transmitting the scannable code to a publisher;
      receiving, from a user device, a retrieval request associated with the online publication and comprising the first network address corresponding to the scannable code;
      mapping the string of characters to the second network address of the online publication based at least in part on the retrieval request associated with the online publication; and
      causing presentation of the online publication by the user device based at least in part on the retrieval request and the second network address.

10. The system of claim 9, wherein the instructions, when executed, cause the system to perform operations comprising:
    receiving, via the publication request, publisher identifier information associated with the publisher, wherein generating the scannable code that encodes the first network address comprises encoding the publisher identifier information within the string of characters.

11. The system of claim 9, wherein the instructions to transmit the scannable code to the publisher, when executed, further cause the system to perform operations comprising:
transmitting the scannable code to the publisher along with an instruction to generate a print publication that comprises at least a portion of the content and the scannable code.

12. The system of claim 9, wherein the instructions, when executed, cause the system to perform operations comprising:
detecting a transaction associated with the online publication; and
compensating the publisher based at least in part on the transaction.

13. The system of claim 12, wherein the instructions to compensate the publisher, when executed, further cause the system to perform operations comprising:
compensating the publisher based at least in part on the transaction being a sale transaction or an account registration transaction.

14. The system of claim 13, wherein the instructions, when executed, cause the system to perform operations comprising:
compensating the publisher a higher compensation for the sale transaction than for the account registration transaction.

15. The system of claim 9, wherein the content is an item listing that includes at least one of a title, a keyword, a sales price, and an item description.

16. The system of claim 9, wherein the scannable code comprises a barcode.

17. A non-transitory machine-readable storage medium comprising processor executable instructions that, when executed by a processor of a machine, cause the machine to perform operations comprising:
receiving a publication request that identifies content to be published in an online publication at a second network address;
generating a scannable code that encodes a first network address different from the second network address, the first network address comprising a string of characters for the online publication;
transmitting the scannable code to a publisher;
receiving, from a user device, a retrieval request associated with the online publication and comprising the first network address corresponding to the scannable code;
mapping the string of characters to the second network address of the online publication based at least in part on the retrieval request associated with the online publication; and
causing presentation of the online publication by the user device based at least in part on the retrieval request and the second network address.

18. The non-transitory machine-readable storage medium of claim 17, wherein the instructions, when executed by the processor of the machine, cause the machine to perform operations comprising:
receiving, via the publication request, publisher identifier information associated with the publisher, wherein generating the scannable code that encodes the first network address comprises encoding the publisher identifier information within the string of characters.

19. The non-transitory machine-readable storage medium of claim 17, wherein the instructions to transmit the scannable code to the publisher, when executed by the processor of the machine, cause the machine to perform operations comprising:
transmitting the scannable code to the publisher along with an instruction to generate a print publication that comprises at least a portion of the content and the scannable code.

20. The non-transitory machine-readable storage medium of claim 17, wherein the scannable code comprises a barcode.

* * * * *